United States Patent

Sagawa

[11] Patent Number: 5,326,400
[45] Date of Patent: Jul. 5, 1994

[54] PLUG MEMBER FOR USE IN COATING AN INTERIOR SURFACE OF A PIPE

[76] Inventor: Shizuo Sagawa, 12-8 Minamikugahara 1-chome, Ota-ku, Tokyo, Japan

[21] Appl. No.: 973,273

[22] Filed: Nov. 19, 1992

[30] Foreign Application Priority Data

Nov. 12, 1991 [JP] Japan .................................. 322403
Sep. 4, 1992 [JP] Japan .................................. 260622

[51] Int. Cl.$^5$ .............................................. B08B 9/04
[52] U.S. Cl. .............................. 118/105; 15/104.061; 427/235
[58] Field of Search ............... 15/3.5, 3.51, 104.061, 15/104.062; 165/95; 134/8; 118/DIG. 10, 105, 215; 427/235

[56] References Cited

U.S. PATENT DOCUMENTS 4,825,498  5/1989  Rankin ........................... 15/104.061
5,127,125  7/1992  Skibowski ...................... 15/104.061

FOREIGN PATENT DOCUMENTS 1953017  4/1971  Fed. Rep. of Germany ........................ 15/104.061
862326   3/1961  United Kingdom .
885906   1/1962  United Kingdom .
1138174 12/1968  United Kingdom .
2114256  8/1983  United Kingdom .

Primary Examiner—Edward L. Roberts
Attorney, Agent, or Firm—Finnegan, Henderson, Farabow, Garrett & Dunner

[57] ABSTRACT

There is disclosed a method for coating an interior surface of an elongated pipe member. The method uses a first plug member having a resilient cylindrical body with an outer diameter close to an inner diameter of the pipe member, and a second plug member having a cylindrical body of an outer diameter smaller than the inner diameter of the pipe member and a brush provided at an end portion of the body of the second plug member, the brush having radially outwardly extending fibers having radial outer ends defining a cylindrical surface of which diameter is close to the diameter of the pipe member. The method comprises steps of inserting the first plug member into the pipe member, supplying a coating material into the pipe member and then inserting the second plug member into the pipe member with the brush being directed rearward, applying a propulsion force to the rearward end of the second plug member to thereby propel the second plug member in the pipe member and the first plug member, the coating material being applied to the interior surface of the pipe member while the plug members are proceeded in the pipe members.

3 Claims, 3 Drawing Sheets

PLUG MEMBER FOR USE IN COATING AN INTERIOR SURFACE OF A PIPE

BACKGROUND OF THE INVENTION

1. Field of the Invention

The present invention relates to a tool and a method for coating an interior surface of an elongated pipe member. More particularly, the present invention pertains to a tool and a method for coating an interior surface of an elongated pipe member using a plug member.

2. Description of the Prior Art

It has been desired to coat an interior surface of a pipe member for use in a heat exchanger for the purpose of preventing corrosion and improving heat exchange efficiency. However, such coating is not easy in view of the fact that the pipe members to be used in a heat exchanger are generally large in length and curved in an complicated configuration.

It has been known to use a plug member for removing scales and slugs on an interior surface of an elongated pipe member. The Japanese patent publication Sho 58-36634 discloses such technology. According the teachings of the Japanese patent publication, the plug member is made of a resilient cylindrical body with or without metallic pins projecting from the outer surface of the body. The plug member is slidably fitted to the pipe member and progressed in the member under a thrust force provided by a hydraulic pressure applied behind the plug member.

It may be possible to apply the known method of removing scales and slugs in a pipe member to a process for coating the interior surface of an elongated pipe member. For example, the plug member may be connected with a tube for continuously supplying the outside surface of the plug member with a coating material while the plug member is being progressed longitudinally in the pipe member. This method of coating the interior surface of the pipe member may not be satisfactory because it may be difficult to obtain a coating of uniform thickness. The problem will be significant in the case of a curved pipe members.

SUMMARY OF THE INVENTION

It is therefore an object of the present invention to provide a method for coating the interior surface of an elongated pipe member with a reliable manner.

Another object of the present invention is to provide a method for providing a coating of substantially uniform thickness on the interior surface of an elongated pipe member.

A further object of the present invention is to provide a tool which can be used efficiently in the method.

According to the present invention, the above and other objects can be accomplished by a method which uses a conventional cylindrical resilient plug member and a novel plug member in accordance with the present invention. The novel plug member comprises a cylindrical body having an external diameter smaller than the internal diameter of the pipe member and a brush including radially outwardly extending fibers having radially outward ends defining a cylindrical surface for contact with the interior surface of the pipe member. The cylindrical body of the novel plug member may be made of a resilient material.

According to the coating method of the present invention, the conventional plug member is first inserted into the pipe member. Then, the coating material is supplied to the pipe member to fill the space behind the conventional plug member. Thereafter, the novel plug member is inserted into the pipe member and progressed forwardly. The forward propulsion force which may be applied to the novel plug member by means of a fluid pressure is transmitted to the conventional plug member through the coating material so that the plug members are proceeded in the pipe member. During this course of operation, the coating material is applied uniformly to the interior surface of the pipe member.

It has been found that the process of the present invention can provide a coating of 50 to 300 μm of a uniform thickness. The coating material may preferably be of a viscosity of 250 to 1200 cp. A preferable propulsion pressure to be applied to the plug member is less than 1 kg/cm². Most preferably, the pressure should be 0.1 to 0.5 Kg/cm².

The invention will further be described with reference to accompanying drawings showing specific embodiments which are considered preferable.

DESCRIPTION OF THE PREFERRED EMBODIMENT

Figure 1:
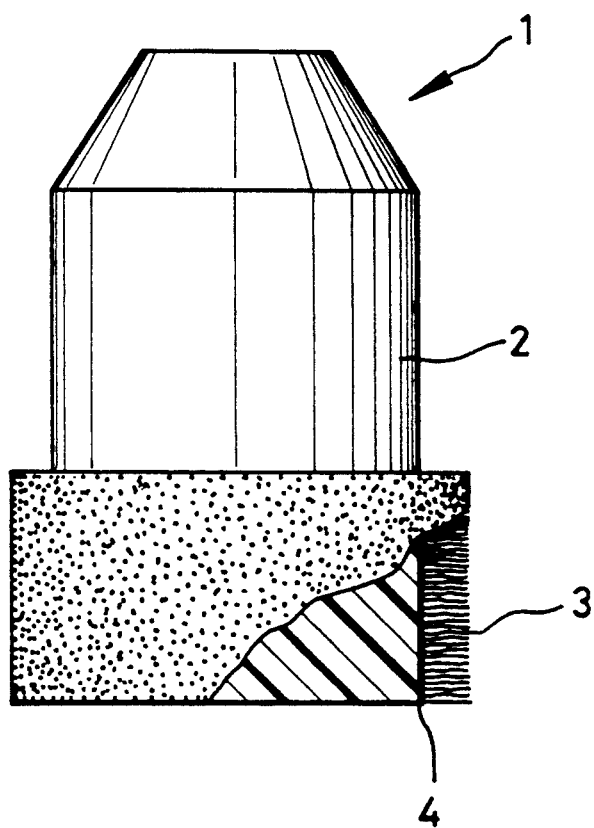
FIG. 1 is a partially sectioned side view of a plug member in accordance with one embodiment of the present invention.

Referring to the drawings, particularly to FIG. 1, there is shown a plug member 1 comprising a cylindrical body 2 which is made of a resilient material such as a foamed polyurethane resin. In the specific embodiment shown in FIG. 1 has a forward end portion which is tapered toward the end, however, this configuration is not absolutely necessary. The body may be provided at the outer surface with a plurality of longitudinally spaced circumferential bands which are not shown in FIG. 1.

At the reward end portion of the body 2, there is provided a brush 3 which is secured to the body 2. The brush 3 has a longitudinal length which is approximately ⅓ of the length of the body 2. The brush 3 is made of a plurality of radially extending fibers of 5 to 35 mm which are embedded on a fabric 4 which is attached to the outer surface of the rear end portion of the body 2.

The length of the fiber influences the thickness of the coating. For example, the fiber length should be approximately 25 mm for the coating thickness of 50 μm. A fiber length of approximately 9 mm is suitable for the coating thickness of 300 μm.

Figure 2:
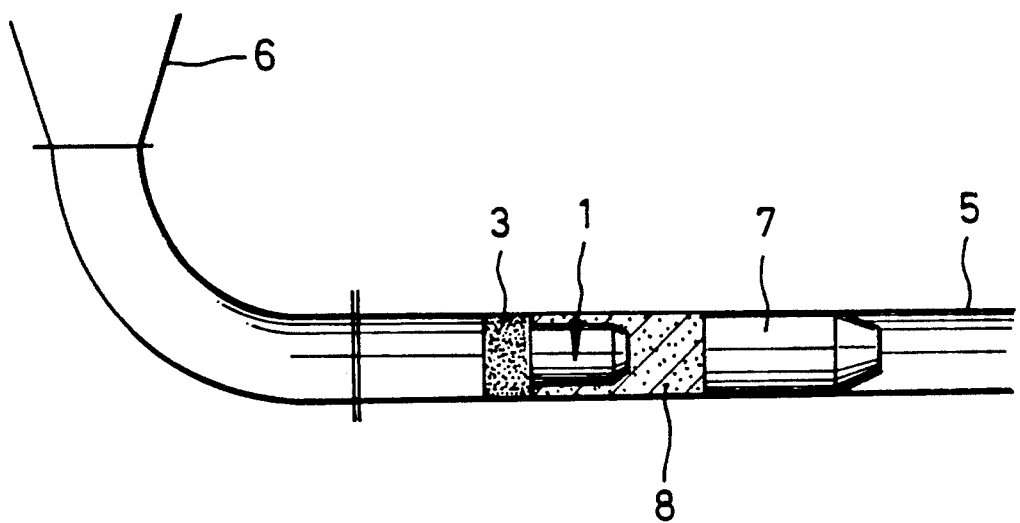
FIG. 2 is a view showing the method in accordance with the present invention.

Referring now to FIG. 2, there is shown one example of the coating process in accordance with the present invention. A pipe member 5 which is to be coated at the interior surface is provided at one end with an outwardly expanded inlet member 6. The pipe member 5 may be of any configuration and length.

In the coating process, a first plug member 7 is slidably inserted through the inlet member 6 into the pipe member 5. The first plug member 7 is made of a resilient cylindrical material such as foamed polyurethane. The first plug member 7 has an outer diameter which is close to the inner diameter of the pipe member 5. After the first plug member 7 is inserted into the pipe member 5, a coating material 8 is supplied into the pipe member behind the first plug member 7. The coating material may be of any conventional type but it is preferred that the material has a viscosity of 250 to 1200 cp.

Thereafter, a second plug member is inserted into the pipe member 5. The second plug member may be the one which is shown in FIG. 1 and has a body 2 and a brush 3. A pneumatic pressure of 0.1 to 0.3 kg/cm$^2$ is then applied through the inlet member 6 to force the second plug member toward the first plug member 7. The coating material between the first and second plug members is compressed and forced to contact with the inner surface of the pipe member 5. The propulsion force applied to the second plug member is transmitted through the coating material to the first plug member 7 so that the first plug member 7 is proceeded forwardly in the pipe member 5 together with the second plug member.

The brush 3 on the second plug member applies the coating material to the interior surface of the pipe member to form a coating of a substantially uniform thickness. It is preferred to use the second plug member having the brush 3 of 25 mm fiber length for the coating thickness of 50 $\mu$m and of 9 mm for the coating thickness of 300 $\mu$m. The contact pressure of the fibers of the brush 3 in the second plug member may be equivalent to the brush pressure which is normally adopted in a roller coating process.

Figure 3:
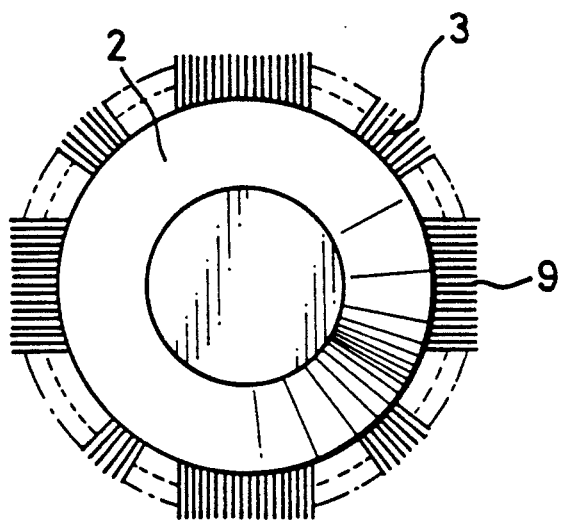
FIG. 3 is a plan view showing a plug member in accordance with another embodiment of the present invention; and, FIG. 4 is a side view similar to FIG. 1 but showing the embodiment of FIG. 3.
Figure 4:
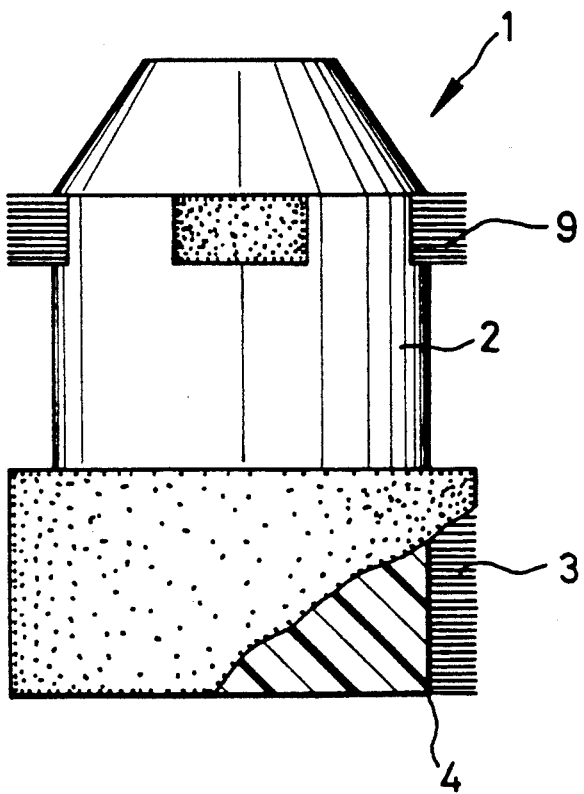

Referring now to FIGS. 3 and 4, there is shown another embodiment of the second plug member. According to this particular embodiment, the plug member has a body 2 and a brush 3 as in the embodiment of FIG. 1. In this embodiment, however, the body 2 is provided at a front portion with circumferentially spaced second brushes 9. The brushes 9 may be made of fibers which are of the same material as the fibers of the brush 3. The second brushes 9 are effective to maintain the second plug member in a concentric relationship with respect to the pipe member 5. The second brushes 9 are also effective to prevent fluctuation of the second plug member during the forward progress of the second plug member. Therefore, the second brushes may not necessarily of substantial longitudinal and circumferential dimensions. The second brushes should be as small as possible because they may increase the drug for propelling the plug members.

The invention has thus been shown and described with reference to specific embodiments, however, it should be noted that the invention is in no way limited to the details of the illustrated structures but changes and modifications may be made without departing from the scope of the appended claims.

I claim:

1. A plug member for use in coating an interior surface of an elongated pipe member, the plug member comprising a body of cylindrical configuration having an outer diameter smaller than an inner diameter of the pipe member, a first brush located at one end of the body, side brush comprising radially outwardly extending fibers having radially outer ends defining a cylindrical surface having a diameter close to the inner diameter of the pipe member nd a second brush located at an opposite end of the body, said second brush comprising a plurality of circumferentially spaced brushes extending around the periphery of the body.

2. The plug member of claim 1, wherein the body is made of a resilient material.

3. The plug member of claim 1, wherein the fibers of the first brush are 5 to 35 mm long.

* * * * *

UNITED STATES PATENT AND TRADEMARK OFFICE
CERTIFICATE OF CORRECTION

PATENT NO. : 5,326,400
DATED : July 5, 1994
INVENTOR(S) : Shizuo Sagawa

It is certified that error appears in the above-indentified patent and that said Letters Patent is hereby corrected as shown below:

Claim 1, column 4, line 27, change "side" to --said--; and column 4, line 30, change "nd" to --and--.

Signed and Sealed this

Twenty-seventh Day of December, 1994

Attest:

BRUCE LEHMAN

Attesting Officer    Commissioner of Patents and Trademarks